United States Patent
VanDuyn et al.

(10) Patent No.: US 10,163,336 B1
(45) Date of Patent: Dec. 25, 2018

(54) UNIVERSAL REMOTE CONTROL OF DEVICES BASED ON ORIENTATION OF REMOTE

(71) Applicant: DISH Network L.L.C., Englewood, CO (US)

(72) Inventors: Luke VanDuyn, Conifer, CO (US); Christopher Burns, Centennial, CO (US)

(*) Notice: Subject to any disclaimer, the term of this patent is extended or adjusted under 35 U.S.C. 154(b) by 0 days.

(21) Appl. No.: 15/663,358

(22) Filed: Jul. 28, 2017

(51) Int. Cl.
*G08C 17/02* (2006.01)

(52) U.S. Cl.
CPC .......... *G08C 17/02* (2013.01); *G08C 2201/32* (2013.01); *G08C 2201/70* (2013.01)

(58) Field of Classification Search
CPC ............... G08C 17/02; G08C 2201/32; G08C 2201/70; G08C 2201/20; G08C 2201/71; G08C 2201/91; G08C 2201/92; G08C 2201/93
USPC ...................................................... 340/12.5
See application file for complete search history.

(56) References Cited

U.S. PATENT DOCUMENTS

| | | | | |
|---|---|---|---|---|
| 6,717,528 | B1* | 4/2004 | Burleson ............... | G08C 17/02 340/12.22 |
| 2005/0212911 | A1* | 9/2005 | Marvit ................... | G06F 3/017 348/154 |
| 2007/0236381 | A1 | 10/2007 | Ouchi et al. | |
| 2009/0241052 | A1* | 9/2009 | Ha ........................ | G06F 3/017 715/772 |
| 2010/0001893 | A1* | 1/2010 | Kim ...................... | G08C 17/02 341/176 |
| 2010/0144436 | A1* | 6/2010 | Marks ................... | G06F 3/017 463/36 |
| 2011/0312311 | A1* | 12/2011 | Abifaker ............... | H04W 4/21 455/418 |
| 2012/0169482 | A1* | 7/2012 | Chen ..................... | G08C 17/02 340/12.52 |

FOREIGN PATENT DOCUMENTS

| | | |
|---|---|---|
| EP | 3328100 A1 | 5/2018 |
| WO | 2016/191875 A1 | 12/2016 |
| WO | 2017/016043 A1 | 2/2017 |

OTHER PUBLICATIONS

Jiahui Wu et al., "MagicPhone," Ubiquitous Computing—Adjunct, ACM, 2 Penn Plaza, Suite 701, New York, NY 10121-0701 USA, Sep. 26, 2010, pp. 451-452, XP058105016, DOI: 10.1145/1864431. 1864483 ISBN: 978-01-4503-0283-8.
International Search Report and Written Opinion for PCT/US2018/041009 dated Sep. 25, 2018, all pages.

* cited by examiner

*Primary Examiner* — Edwin Holloway, III
(74) *Attorney, Agent, or Firm* — Kilpatrick Townsend & Stockton, LLP

(57) ABSTRACT

Various arrangements involving an absolute direction of a remote control device are presented herein. In response to user input received by a remote control device, the orientation of the remote control device may be determined. A compass heading direction in which the remote control device is pointed may be determined. An absolute direction may be determined based on the determined orientation and the determined compass heading. A target control device may be selected from a plurality of target control devices based on the absolute heading of the remote control device. A message indicative of the user input may then be transmitted to the selected target control device.

17 Claims, 7 Drawing Sheets

UNIVERSAL REMOTE CONTROL OF DEVICES BASED ON ORIENTATION OF REMOTE

BACKGROUND

Universal remotes allow a user to control multiple devices using the same remote control. Typically, a user presses a button on the remote control in order to specify the device that the user desires to control, then presses another button to indicate a command that the user desires to have sent to the specified device. Such an arrangement may be convenient when a user infrequently switches between devices or has a small number of devices to control. However, if the user is frequently switching between devices, the user has a large number of devices, or the user desires to forgo selecting the device to be controlled, such a universal remote control may not be ideal.

SUMMARY

Various embodiments are described related to a remote control device. In some embodiments, a device for remote control is described. The device may include a user interface. The device may include an accelerometer. The device may include a magnetometer. The device may include a wireless communication interface. The device may include a processing system that is in communication with the wireless communication interface, receives input from the user interface, and receives measurements from the accelerometer and the magnetometer. The processing system may be configured to, in response to user input received via the user interface, determine an orientation of the remote control device with respect to gravity based on one or more measurements received from the accelerometer. The system may determine a compass heading direction in which the remote control device is pointed based on one or more measurements received from the magnetometer. The system may determine an absolute direction based on a determined orientation and a determined compass heading direction. The system may select a target control device from a plurality of target control devices based on an absolute heading of the remote control device. Each target control device of the plurality of target control devices may be mapped to a range of absolute headings. The system may determine a command language mapped to a selected target control device of the plurality of target control devices. The system may cause a message indicative of the user input to be transmitted in a determined command language to the selected target control device by the wireless communication interface.

Embodiments of such a processing system may include one or more of the following: The system may be configured to initiate a configuration process in response to a second user input. The system may receive an indication of the target control device. The system may receive user input indicating that the remote control device is pointed in a first absolute direction that is to be mapped to the remote control device. The system may link the absolute direction with the target control device indicated by the indication. The system may initiate a configuration process in response to a second user input. The system may receive an indication of the target control device. The system may receive user input indicating that the remote control device is pointed in a first absolute direction that is desired to be mapped to the remote control device. The system may determine that the first absolute direction is within a threshold range of a second absolute direction linked with another target control device of the plurality of target control devices. The system may output an indication that the first absolute direction is not available to be linked with the target control device. The system may be configured to, in response to determining that the first absolute direction is within the threshold range of the second absolute direction linked with another target control device, determine a recommended third absolute direction to link with the target control device. The system may output an indication of the recommended third absolute direction as a suggested absolute direction for control of the target control device. The system may determine a new control session is to begin. The system may receive user input indicative of the remote control device being pointed at a predefined calibration point. The system may determine a plurality of absolute headings for the plurality of target control devices based on the predefined calibration point. The plurality of absolute headings may be comprised of the absolute heading. The device may be comprised of a plurality of wireless communication interfaces that includes the wireless communication interface. The system may select the wireless communication interface based on the selected target control device such that the message indicative of the user input is transmitted via a selected wireless communication interface. The plurality of target control devices may be comprised of a television receiver and a television. The system may select the target control device from the plurality of target control devices based on the user input. User input may exclude one or more target control devices of the plurality of target control devices from eligibility for selection.

In some embodiments, a method for controlling a device is described. The method may include receiving, by a remote control device, user input. The method may include, in response to receiving the user input, determining by a remote control device an orientation of the remote control device with respect to gravity based on one or more measurements received from an accelerometer. The method may include determining, by a remote control device, a compass heading direction in which the remote control device is pointed based on one or more measurements received from a magnetometer. The method may include determining, by the remote control device, an absolute direction based on a determined orientation and a determined compass heading direction. The method may include selecting, by the remote control device, a target control device from a plurality of target control devices based on an absolute heading of the remote control device. Each target control device of the plurality of target control devices may be mapped to a range of absolute headings. The method may include determining, by the remote control device, a command language mapped to a selected target control device of the plurality of target control devices. The method may include transmitting, by the remote control device, a message indicative of the user input in a determine command language to the selected target control device.

Embodiments of such a method may include initiating a configuration process in response to a second user input. The method may include receiving an indication of the target control device. The method may include receiving user input indicating that the remote control device is pointed in a first absolute direction that is to be mapped to the remote control device. The method may include linking the absolute direction with the target control device indicated by the indication. The method may include initiating a configuration process in response to a second user input. The method may include receiving an indication of the target control device.

The method may include receiving user input indicating that the remote control device is pointed in a first absolute direction that is desired to be mapped to the remote control device. The method may include determining that the first absolute direction is within a threshold range of a second absolute direction linked with another target control device of the plurality of target control devices. The method may include outputting an indication that the first absolute direction is not available to be linked with the target control device. The method may include, in response to determining that the first absolute direction is within the threshold range of the second absolute direction linked with another target control device, determining a recommended third absolute direction to link with the target control device. The method may output an indication of the recommended third absolute direction as a suggested absolute direction for control of the target control device. The method may include determining a new control session is to begin. The method may include receiving user input indicative of the remote control device being pointed at a predefined calibration point. The method may include determining a plurality of absolute headings for the plurality of target control devices based on the predefined calibration point. The plurality of absolute headings may be comprised of the absolute heading. The method may include selecting, by the remote control device, a wireless communication interface based on the selected target control device such that the message indicative of the user input is transmitted via a selected wireless communication interface. The plurality of target control devices may be comprised of a television receiver and a television. The method may include selecting the target control device from the plurality of target control devices based on the user input. User input may exclude one or more target control devices of the plurality of target control devices from eligibility for selection.

In some embodiments, a non-transitory processor-readable medium is described. The device may include processor-readable instructions. The instructions may be configured to cause one or more processors to receive user input. The instructions may be configured to, in response to the user input, determine an orientation of a remote control device with respect to gravity based on one or more measurements received from an accelerometer. The instructions may determine a compass heading direction in which the remote control device is pointed based on one or more measurements received from a magnetometer. The instructions may determine an absolute direction based on a determined orientation and a determined compass heading direction. The instructions may select a target control device from a plurality of target control devices based on an absolute heading of the remote control device. Each target control device of the plurality of target control devices may be mapped to a range of absolute headings. The instructions may determine a command language mapped to a selected target control device of the plurality of target control devices. The instructions may cause a message indicative of the user input to be transmitted in a determined command language to the selected target control device. The instructions initiate a configuration process in response to a second user input. The instructions may receive an indication of the target control device. The instructions may receive user input indicating that the remote control device is pointed in a first absolute direction that is to be mapped to the remote control device. The instructions may link the absolute direction with the target control device indicated by the indication. The instructions may initiate a configuration process in response to a second user input. The instructions may receive an indication of the target control device. The instructions may receive user input indicating that the remote control device is pointed in a first absolute direction that is desired to be mapped to the remote control device. The instructions may determine that the first absolute direction is within a threshold range of a second absolute direction linked with another target control device of the plurality of target control devices. The instructions may output an indication that the first absolute direction is not available to be linked with the target control device. The instructions may be configured to, in response to determining that the first absolute direction is within the threshold range of the second absolute direction linked with another target control device, determine a recommended third absolute direction to link with the target control device. The instructions may output an indication of the recommended third absolute direction as a suggested absolute direction for control of the target control device.

DETAILED DESCRIPTION

Rather than a user having to select a particular device to be controlled, a remote control may be able to determine the device to be controlled based on an absolute direction in which the remote control is pointed. Different absolute directions may be mapped to different devices. A remote control may include an accelerometer and/or gyroscope to determine an orientation of the remote control, such as in respect to gravity. While such sensors may be able to determine a device's relative orientation with respect to gravity, such sensors may not be able to determine an absolute direction. A magnetometer may allow for a compass heading with respect to the Earth's magnetic field to be determined. Measurements made by a magnetometer in combination with an accelerometer and/or gyroscope may allow for an absolute direction based on the compass heading and orientation of the remote control to be determined. Each of these measurements may be insufficient alone: while an accelerometer may be able to determine tilt, rotation, and an angle of the remote control with respect to gravity, it may not be able to determine the direction orientation of the remote control with respect to the earth's magnetic field (e.g., is the remote control pointed generally north or south). A magnetometer may be able to determine a compass heading (e.g., north, south) but may not be able to detect tilt, rotation, and/or an angle of the remote control with respect to gravity. In concert, an absolute direction (which includes orientation in relation to gravity and a compass heading) may be determined.

Different absolute directions may be mapped to different devices such as, for example, the direction towards a device from a particular location within a room. Such absolute directions may be mapped from one or more particular locations within a room. Therefore, by pointing a remote control at the device desired to be controlled, the remote control or a host system in communication with the remote control can determine the appropriate device to which a command is to be sent in response to user input.

In various embodiments, a user configuration process may be performed to establish absolute directions that are associated with various devices. The initial configuration process may ensure adequate separation between different absolute directions such that a user does not inadvertently control the wrong device. In some embodiments, an initial session configuration may be performed to establish the absolute directions that are to be associated with devices during the session.

Figure 1:
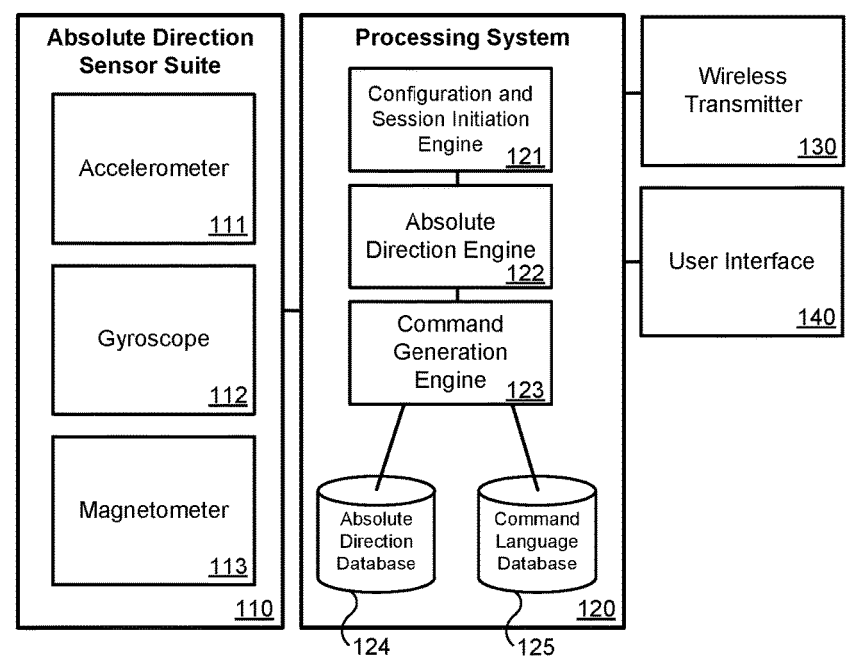
FIG. 1 illustrates an embodiment of a block diagram of a remote control device.

FIG. 1 illustrates an embodiment of a block diagram of a remote control device 100. Remote control device 100 may include absolute direction sensor suite 110, processing system 120, wireless transmitter 130, and user interface 140. It should be understood that various other components, such as various computerized components, have been omitted from FIG. 1 for simplicity. For example, memories, other computer readable mediums, a power supply, a communication bus, etc. have not been illustrated and described.

Absolute direction sensor suite 110 may include: accelerometer 111, gyroscope 112, and magnetometer 113. Accelerometer 111 may measure acceleration or a rate of change of velocity of the remote control device 100. Since the effective gravity on an object can be indistinguishable from acceleration, accelerometer 111 can be used to determine the direction of gravity. In relation to the direction of gravity, measurements from accelerometer 111 may be used to determine an orientation of the remote control device 100, such as an angle the remote control device 100 is being held at with respect to gravity and side-to-side rotation of the remote control device 100 with respect to gravity.

Gyroscope 112 may represent a three axes MEMS-based gyroscope that can measure the extent and rotation of the remote control device 100 in which gyroscope 112 is incorporated (i.e., roll, pitch, and yaw). Such measurements may be used in combination with measurements from magnetometer 113 and/or accelerometer 111 to determine an absolute direction in which remote control device 100 is pointed.

Magnetometer 113 may function as a compass by measuring the direction of the Earth's ambient magnetic field. Magnetometer 113 may be a MEMS-based magnetic field sensor. Magnetometer 113, in combination with accelerometer 111 and, possibly, gyroscope 112, may be used for determining an absolute direction in which remote control device 100 is pointed. Absolute direction sensor suite 110 may be a single MEMS package.

Processing system 120 may receive measurements from accelerometer 111, gyroscope 112, magnetometer 113 or a subset thereof. Processing system 120 may include: configuration and session initiation engine 121, absolute direction engine 122, command generation engine 123, absolute direction database 124, and command language database 125. The various components of processing system 120 may be implemented using one or more processors and non-transitory computer readable mediums. Configuration and session initiation engine 121, absolute direction engine 122, and command generation engine 123 may be implemented in the form of one or more special-purpose processors or in the form of software instructions executed by one or more general-purpose processors.

Configuration and session initiation engine 121 may serve to configure and link particular absolute directions with particular target control devices. Configuration and session initiation engine 121 may request that a user select a particular target control device and a desired absolute direction. In many circumstances, a user may desire that an absolute direction that points from a user's typical position within a room to the particular target control device be the absolute direction mapped to the particular target control device. For instance, when watching TV, a user may tend to sit in the same seat. The absolute direction selected by the user may point directly at the particular target control device from the seat. However, in some circumstances, a user may desire an arbitrary absolute direction be linked with a particular device. For example, a light present on a wall may be linked with an absolute direction in which a user points the remote control directly down at the floor regardless of where the user is located. Further detail regarding an initial configuration performed by configuration and session initiation engine 121 is detailed in relation to method 600.

In addition to performing initial configuration, configuration and session initiation engine 121 may be used to initiate a particular use session. Prior to controlling various target control devices at a given time, a user may perform a brief session initiation procedure such that processing system 120 can determine where within a room the user is located with a remote control device 100. The absolute directions mapped with particular target control devices may be adjusted based on the session initiation to account for the user being in a different location within the room. A session initiation may involve the user aiming remote control device 100 at a particular point in the room from where the user intends to issue future commands. This calibration may allow various absolute directions mapped with various target control devices to be adjusted. Therefore, regardless of where a user is sitting in the room, the absolute direction to control a particular target control device may be in a direction aimed at a particular target control device. Further detail regarding calibration performed by configuration and session initiation engine 121 is provided in relation to FIG. 4.

Absolute direction engine 122 may receive the measurements from accelerometer 111, gyroscope 112, and/or magnetometer 113. From these measurements, absolute direction engine 122 may determine an absolute direction in which remote control device 100 is pointed. Absolute direction engine 122 may determine a pair of angles in a spherical coordinate system that indicates an absolute direction in which remote control device 100 is pointed. Various other forms of representing the absolute direction which remote control device 100 is pointed may be possible, such as angles or a point in a Cartesian coordinate system.

Command generation engine 123 may create a command for transmission to a particular target control device based on absolute direction received from absolute direction engine 122. Command generation engine 123 may access absolute direction database 124 to determine a particular target control device that has been mapped to the absolute direction output by absolute direction engine 122. Absolute direction database 124 may map various absolute directions to various target control devices. Absolute direction database 124 may specify a range of angles or range of absolute directions in which matches are considered present if the absolute direction determined by absolute direction engine 122 falls within the range. In other embodiments, command generation engine 123 may evaluate absolute direction database 124 for a match within a predefined direction threshold for a match.

Based on the target control device determined by command generation engine 123, command language database 125 may be accessed to determine a particular command to be transmitted via wireless transmitter 130 in response to received user input via user interface 140. User interface 140 may include a keypad that has various buttons typically found on a remote control, such as numbers, a power button, a mute button, volume buttons, channel up and down buttons, etc. In response to a user pushing such a button on user interface 140 of remote control device 100, processing system 120 may be configured to determine the absolute direction which the remote control device 100 is pointed and have command generation engine 123 determine the target control device attempting to be controlled. Command language database 125 may be accessed to determine the specific command that should be transmitted based on the received user input and the particular target control device that has been identified. For example, the format or content of a mute message may be different when transmitted to a television as opposed to a separate receiver. Command language database 125 may also specify the transmitter type through which the command should be transmitted, such as via infrared (IR) or RF. In addition or alternate to a keypad, a touchpad or voice-control system may be incorporated as part of user interface 140. For clarity, a "command" refers to any input provided by a user via user interface 140 that is to be transmitted via wireless transmitter 130; for example, a command could be a numerical input or a "power off" command.

Wireless transmitter 130 may allow commands generated by command generation engine 123 to be transmitted wirelessly to one or more devices. In some embodiments, wireless transmitter 130 can communicate directly with various target control devices. Wireless transmitter 130 may be an IR or RF transmitter. In some embodiments, multiple wireless transmitters are present such that remote control device 100 can communicate using IR, RF, ZIGBEE, Z-WAVE, BLUETOOTH, WI-FI, and/or some other form of wireless communication. In some embodiments, rather than wireless transmitter 130 communicating directly with various target control devices, wireless transmitter 130 may communicate with a single host device which, in turn, communicates with various target control devices. For instance, wireless transmitter 130 may communicate with a home automation host system which can then communicate with various target control devices located within the same room or throughout a home of the user.

Figure 2:
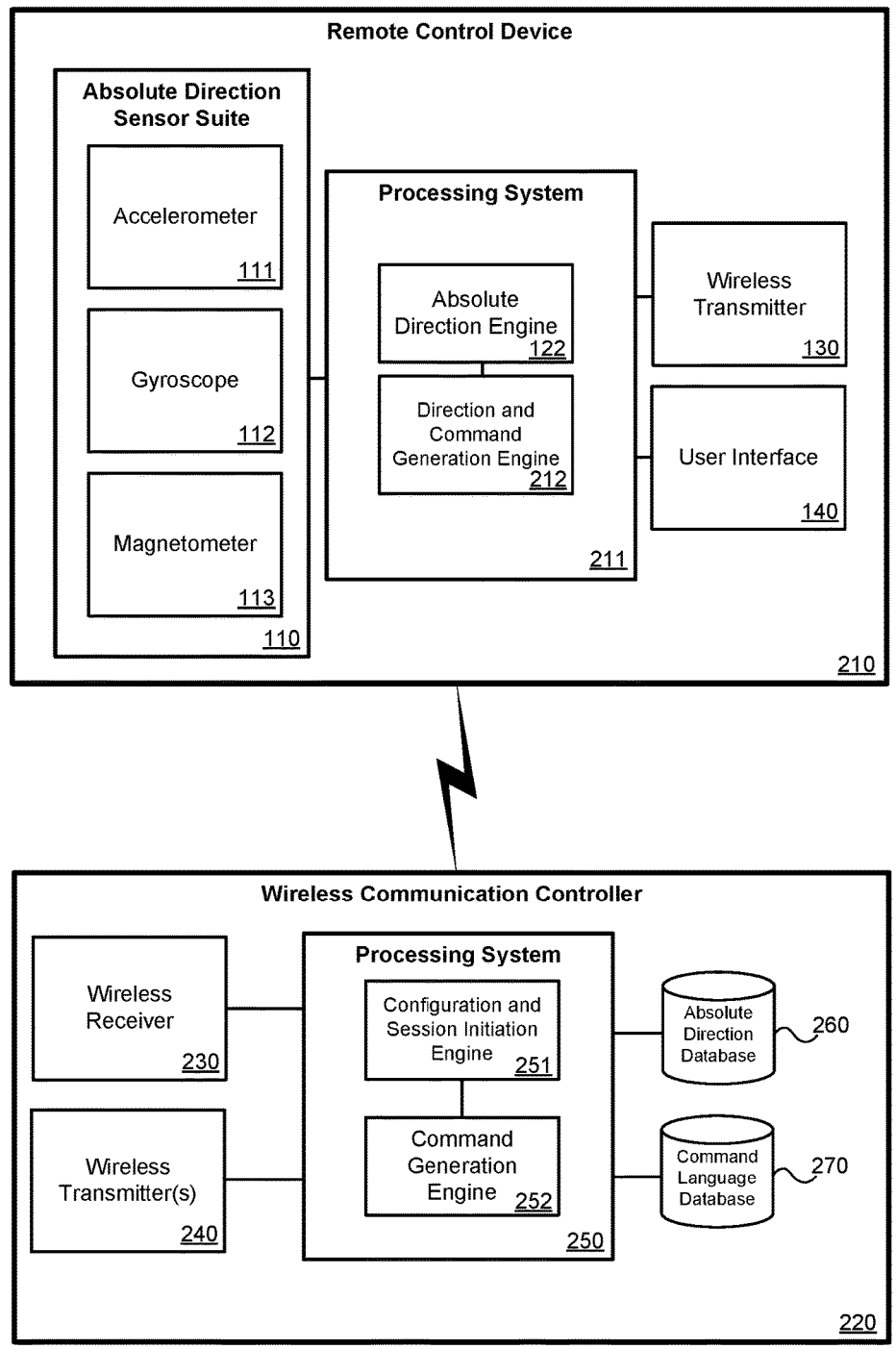
FIG. 2 illustrates an embodiment of a block diagram of a remote control system.

FIG. 2 illustrates an embodiment of a block diagram of a remote control system 200. In remote control system 200, rather than various processing functions being performed directly at the remote control device 210, such processing may be performed by a wireless communication controller 220. Wireless communication controller 220 may be a dedicated wireless communication controller device or may be incorporated within various other devices, such as a television receiver (e.g., television set top box), A/V equipment, or any home automation device.

Remote control device 210 may include absolute direction sensor suite 110 as detailed in relation to remote control device 100. Processing system 211 may include absolute direction engine 122 as detailed in relation to remote control device 100. However, rather than having a locally stored absolute direction database and command language database, processing system 211 may have direction and command generation engine 212. Direction and command generation engine 212 may cause wireless transmitter 130 to output a message to wireless communication controller 220 that indicates the absolute direction, and a command input by user via user interface 140. Therefore, the absolute direction included in the message may indicate the absolute direction in which remote control device 210 is being held when the command was input via user interface 140.

Wireless communication controller 220 may include: wireless receiver 230, wireless transmitters 240, processing system 250, absolute direction database 260, and command language database 270. Wireless communication controller 220 may include various computerized components, such as one or more processors, one or more memories, one or more data buses, etc. Wireless receiver 230 may receive messages from wireless transmitter 130 of remote control device 210. Processing system 250, which may include one or more specialized processors or one or more general-purpose processors that execute instructions or software, may receive messages from wireless receiver 230. These messages may include an indication of an absolute direction in which remote control device 210 was pointed when a user input the requested command and an indication of the requested command. Command generation engine 252 may function similarly to command generation engine 123 of remote control device 100 by accessing absolute direction database 260 and command language database 270 as detailed in relation to absolute direction database 124 and command language database 125. Similarly, configuration and session initiation engine 251 may function similarly to configuration and session initiation engine 121 as detailed in relation to remote control device 100. Processing system 250 may transmit the commands generated by command generation engine 252 to the appropriate target control device via wireless transmitters 240. One or more wireless transmitters 240 may be present. For example an IR and/or RF transmitter may be present. Various wireless transmitters 240 may be placed in various locations to enable communication with target control devices that require a line of sight for IR communication that are not located within line of sight of wireless communication controller 220, such as by being in a different room.

Figure 3A:
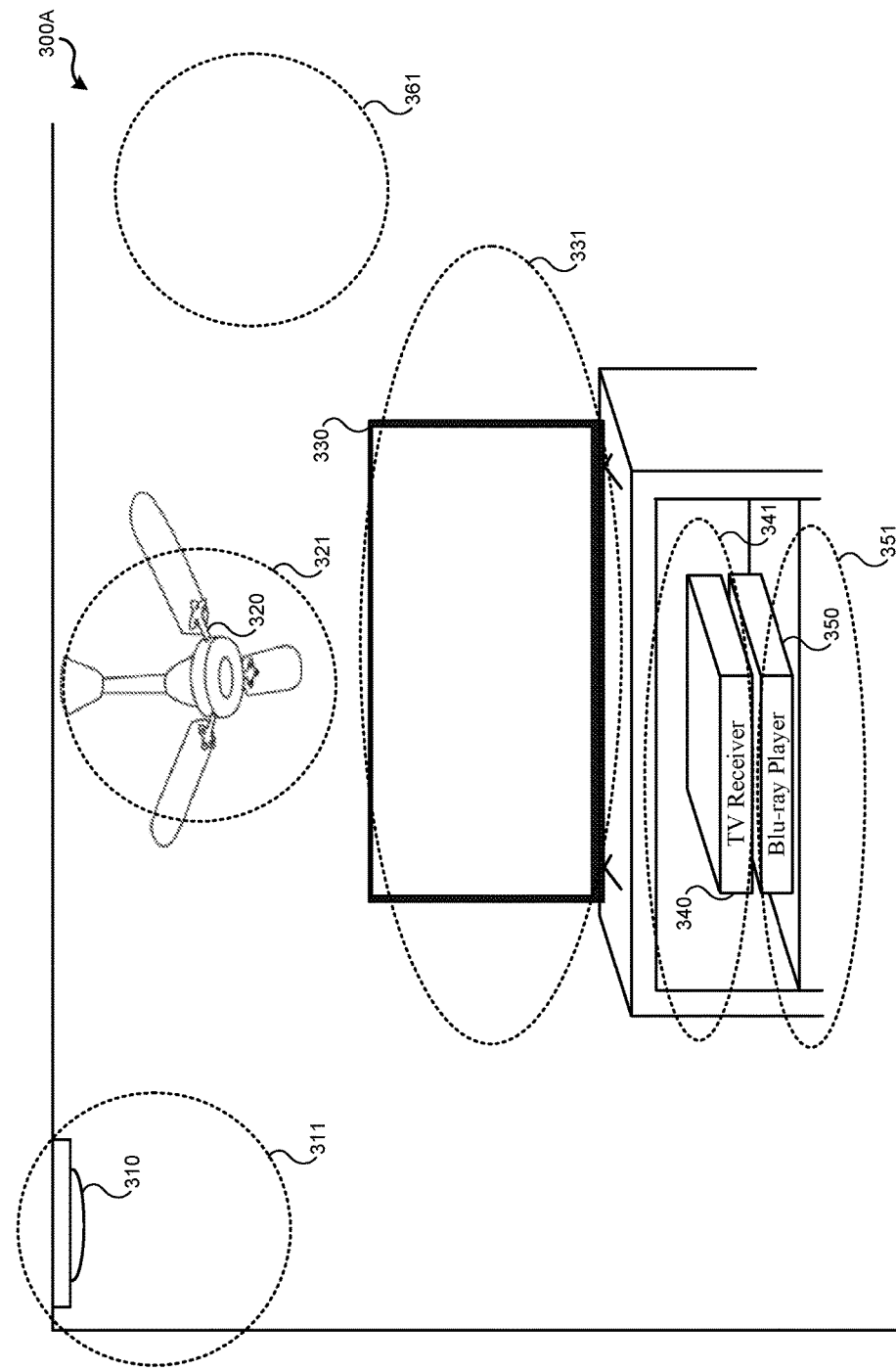
FIGS. 3A and 3B illustrate embodiments of a remote control device having various absolute directions linked with different target control devices.
Figure 3B:
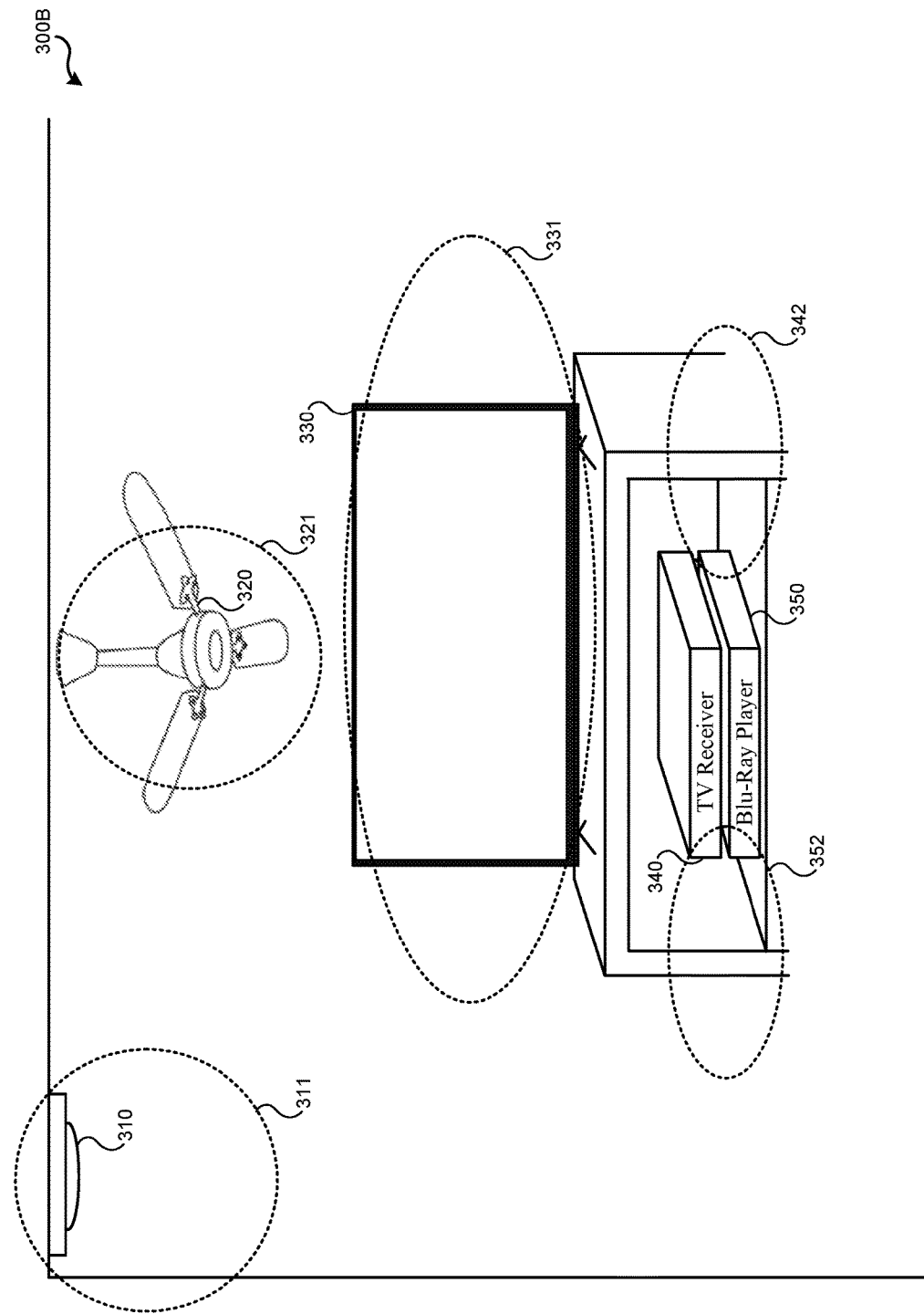

FIGS. 3A and 3B illustrate embodiments of a remote control device having various absolute directions linked with different target control devices. Embodiment 300A of FIG. 3A illustrates a point of view a user may have when sitting in his usual position within a room having multiple devices that are typically controlled via a remote control. In embodiment 300A, the following target control devices are present: smart light 310, ceiling fan 320, television 330, television receiver 340, and Blu-ray player 350. Each of these target control devices is mapped to an absolute direction. From the location where the user usually sits (e.g., to watch TV), the absolute directions have been mapped by the user to roughly correspond to the location of the target control devices. Each of these absolute directions has a threshold angular range, such that the user does not need to precisely replicate the absolute direction linked with a target control device in order to control such device. The threshold angular range may vary based on how close the absolute direction linked to the device is with another absolute direction linked with another device. This threshold angular range results in an "absolute direction region," referring to a region surrounding an absolute direction, thus allowing a user some amount of error when attempting to point the remote control in an absolute direction. The absolute direction region may be created based on one or more threshold angles applied to a defined absolute direction to obtain the absolute direction region. Different angles may be used in the vertical and horizontal directions. For example, absolute direction region 311 may be mapped to smart light 310 and absolute direction region 321 may be mapped to ceiling fan 320. Since no other target control devices are near smart light 310, then no modifications may be made to the shape of absolute direction region 311. However, referring to television receiver 340, absolute direction region 341, which is mapped to television receiver 340, may be adjusted in shape due to the proximity of absolute direction region 351 which is mapped to Blu-ray player 350. Absolute direction region 331 may be mapped to television 330 and may be made larger since television 330 is a large device and the user may expect to be able to aim a remote control in any portion of television 330 and be able to control it.

It should be clear, however, that an absolute direction selected by a user may be arbitrary from the location of the mapped target control device. For instance, absolute direction region 361 may be mapped to a target control device located within the same room or within a different room. For example, a user may find it more convenient to remember that absolute direction region 361 is linked with a particular target control device than pointing the remote control in the actual direction of the target control device.

In FIG. 3A, the advantages of having different absolute directions associated with the different target control devices are made apparent. For example, if the user wishes to turn on smart light 310, television 330, television receiver 340, and Blu-ray player 350, in a conventional arrangement, the user may need to use a separate remote control for each device. However, in using remote control device 100 or remote control device 210, a user may simply point the remote control device at absolute direction region 311 and press power to turn the power on to smart light 310, point the remote control device at absolute direction region 331 and press the power button again to turn on television 330, point the remote control device at absolute direction region 341 and press the power button again to turn on television receiver 340, and point the remote control device at absolute direction region 351 and press the power button again to turn on Blu-ray player 350.

In FIG. 3B, a recommendation has been made to the user (by either the remote control device itself or a wireless communication controller) to associate different absolute direction regions with television receiver 340 due to their physical proximity. In embodiment 300B, absolute direction region 342 is mapped to television receiver 340 and absolute direction region 352 is mapped to Blu-ray player 350. As such, in order to communicate with such devices, a user may be required to remember that absolute direction region 352 to the left of television receiver 340 and Blu-ray player 350 is mapped to Blu-ray player 350 and absolute direction region 342 to the right of television receiver 340 and Blu-ray player 350 is mapped to television receiver 340.

It should be understood that the various devices and arrangement of the devices of FIGS. 3A and 3B are merely examplary to illustrate features of the embodiments.

Figure 4:
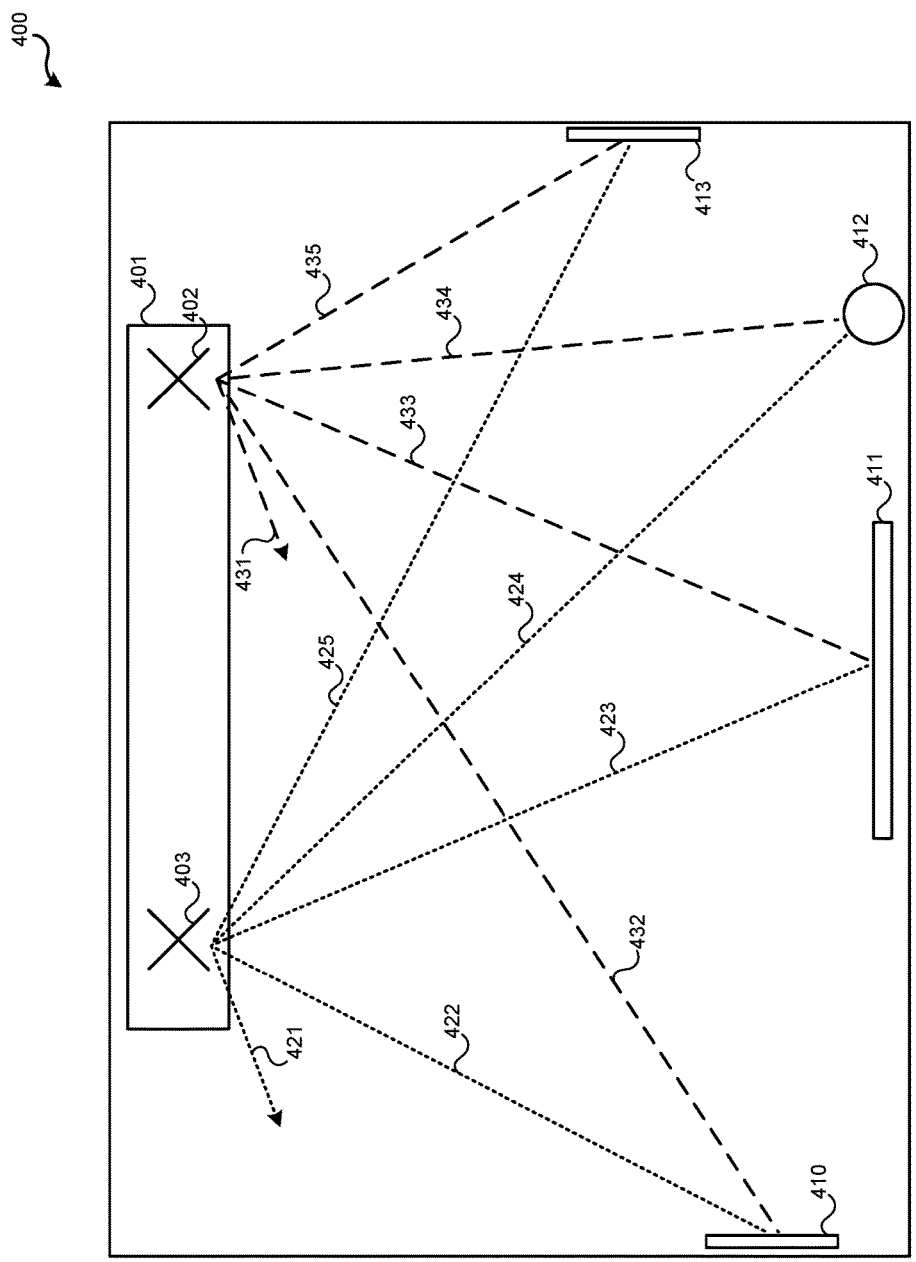
FIG. 4 illustrates an embodiment of a remote control device that undergoes an initial calibration.

FIG. 4 illustrates an embodiment of a remote control device that undergoes an initial session calibration. Regardless of where a user is located within a room, he may wish to be able to point the remote control directly at a target control device or object within a room in order to control the target control device (or smart control device mapped to the object). In such an arrangement, the absolute direction will vary based on where within the room the user is located, such as at location 402 or location 403. Therefore, in some embodiments, the absolute direction may be adjusted based on where the user is located within the room.

A "session" may refer to a time when a user uses a remote control device from a particular location, such as a particular spot or seat within a room. A session may end if user input is not provided to the remote control within a defined period of time, such as one hour. The various absolute directions mapped with target control devices may, in some embodiments, be adjusted based on where a user is located within a room. Such an arrangement may be useful if a user desires the absolute directions mapped with target control devices to be directly at the target control devices regardless of the user's location. For example, referring to FIG. 4, a user may desire absolute direction 422 to control smart device 410 when the user is at location 403, but may desire absolute direction 432 to control smart device 410 when the user is at location 402.

In embodiment 400, a floor plan of a room is represented having couch 401, smart device 410, television 411 smart light 412, and smart device 413. In embodiment 400, a user may desire absolute directions which the user aims the remote control device in order to control the various devices to change based on where the user is located within the room. Location 402 and location 403 indicate two of the possible places where the user may sit within the room. Referring, for example, to location 403, the user may desire absolute directions 422, 423, 424, and 425 to be mapped to smart device 410, television 411 smart light 412, and smart device 413; however, referring to location 402, the user may desire absolute directions 432, 433, 434, 435 to be mapped to smart device 410, television 411 smart light 412, and smart device 413.

To initiate a session, once a user has arrived at a location from which the user desires to control target control devices, the user may perform a calibration procedure. The calibration procedure may include providing predefined user input, such as pressing a predefined button on the remote control while aiming the remote control at a designated calibration point within the room. For example, in embodiment 400, television 411 may serve as the designated calibration point. If the user is sitting at location 403, to initiate a session, the user may push a predefined key on the remote control device while aiming the remote control device at television 411, as illustrated by absolute direction 423. If instead the user is sitting at location 402, to initiate the session, the user may push the predefined key on the remote control device while aiming the remote control device at television 411, as illustrated by absolute direction 433.

By the remote control device performing initial calibration, absolute directions or direction regions may be accessed based on a set of absolute directions that have been mapped to different calibration measurements. That is, during an initial setup procedure, a user may have defined different absolute directions to be mapped with different calibration directions. Therefore, while user is seated at location 403, a first set of absolute directions may be used for control of target control devices based on the remote control device being calibrated using absolute direction 423, but a second set of absolute directions may be used for control of target control devices when a user is seated at location 402 and the remote control device was calibrated to the television along absolute direction 433.

In some embodiments, rather than different sets of absolute directions being stored and used for different calibration directions, absolute directions may be calculated based on where a user performs a calibration procedure. During an initial configuration, absolute directions may be linked with target control devices from two or three different locations within the room at which the user has performed a calibration. Based on these absolute directions, it may be possible to triangulate or otherwise calculate a point or region within the room that the user desires to have mapped to a particular target control device (e.g., where the various absolute directions linked with the same target control device roughly intersect). Once a sufficient number of absolute directions from various locations within the room have been gathered, the absolute directions for each target control device may be recalculated for each session based on the location of the user and the calibration process.

In some embodiments, some or all target control devices may be mapped to an arbitrary direction. As detailed herein, an "arbitrary direction" is a type of absolute direction that never changes based on where a user is located within a room. For instance, a target control device may be linked with arbitrary direction 421 when a user is located at location 403. Arbitrary direction 431 represents the same direction as arbitrary direction 421, but from location 402. From a user's point of view, while the direction is the same, the user will be pointing the remote control device at a different object or point on the wall since the arbitrary direction does not shift based on where the user is located within the room. In some embodiments, it may be possible to have a mix of arbitrary directions and absolute directions or exclusively one of the types.

Figure 5:
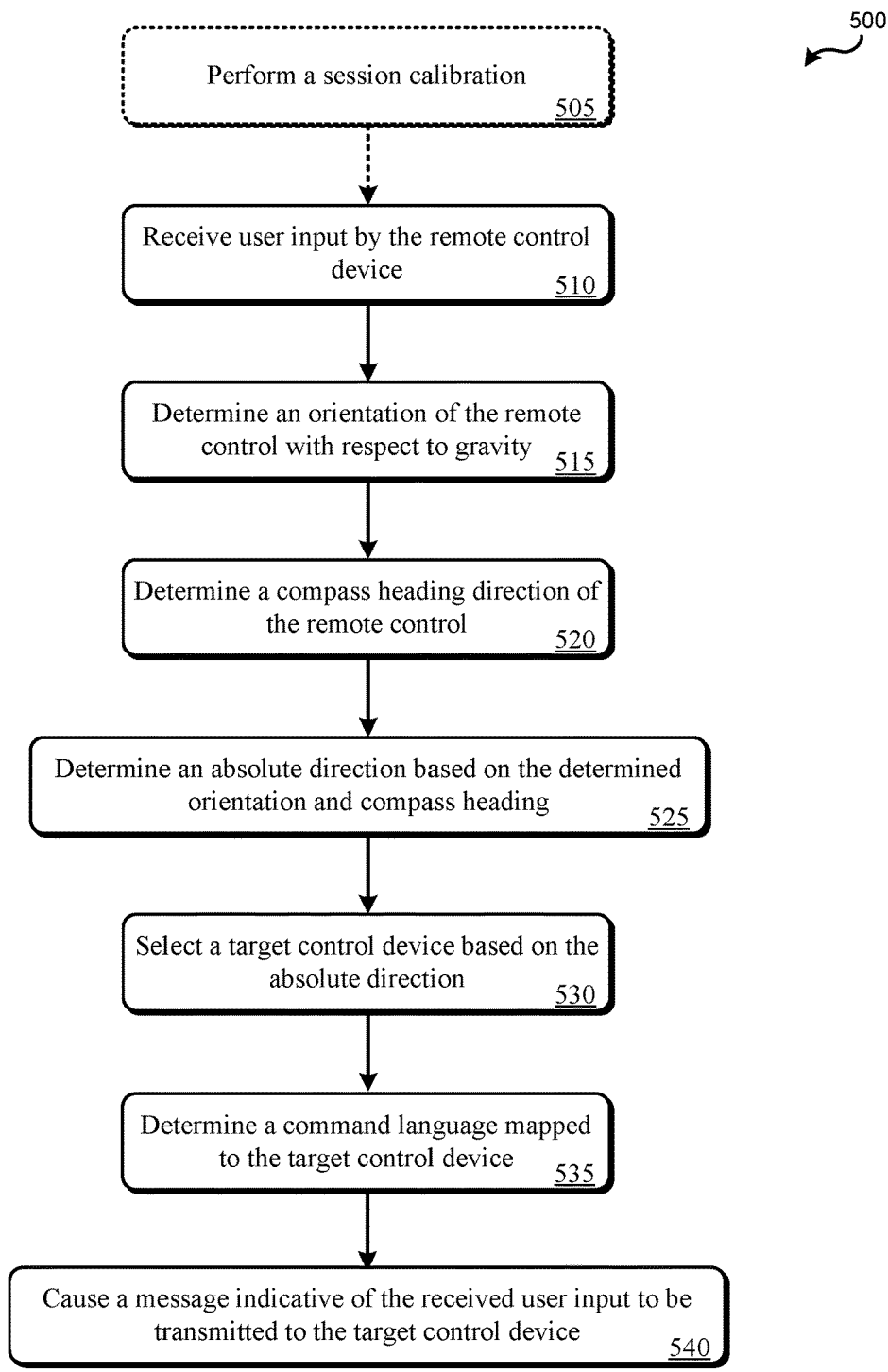
FIG. 5 illustrates an embodiment of a method for controlling a device using an absolute direction of a remote control device.

Various methods may be performed using the devices and systems detailed in relation to FIGS. 1-4. FIG. 5 illustrates an embodiment of a method 500 for controlling a device using an absolute direction of a remote control device. Steps of method 500 may be performed using remote control device 100 of FIG. 1, remote control system 200 of FIG. 2, or some other embodiment of a remote control device or system.

In some embodiments of method 500, at block 505 a session calibration may be performed. The session calibration may involve the user pointing the remote control device at a predefined object or location within a room. The user may then press a button or provide another form of input to the remote control device while the remote control device is pointed at the predefined object or location. In response to the user input, the session may be initiated and absolute directions that are mapped to each target control device may be either selected or calculated as detailed in relation to embodiment 400. In other embodiments, the calibration of block 505 may not be necessary, such as if it is assumed the user is always located in a particular location within the room or arbitrary directions are used for controlling the target control devices.

At block 510, user input may be received by the remote control device. This may involve the user pressing a button, speaking into, or providing touch input to the remote control device. Any of these forms of input may be understood as a command that is to be transmitted to a target control device. Blocks 515 through 540 may be performed in response to the user input being received at block 510.

At block 515, an orientation of the remote control with respect to gravity may be determined. The orientation determined at block 515 may be performed based on measurements made using one or more accelerometers located on the remote control device. At block 520, a compass heading direction of the remote control may be determined. The compass heading direction of the remote control may be performed using one or more magnetometers located on the remote control device. In some embodiments, the measurements of blocks 515 and 520 may be augmented using measurements from a gyroscope.

At block 525, an absolute direction may be determined based on the previously determined orientation and compass headings from blocks 515 and 520. The absolute direction may indicate both an orientation of the remote control device and a compass heading.

At block 530, a target control device may be selected based on the absolute direction determined at block 525 indicative of the absolute direction of the remote control device when the user input was provided to the remote control device at block 510. The target control device determined at block 530 may be selected from a database or other storage arrangement of target control devices that are mapped with various absolute direction regions. In some embodiments, based on the user input received at block 510, various target control devices may be excluded from being eligible for selection of block 530. For instance, if a command input by user at block 510 is inapplicable to a particular target device (e.g., a volume up command would be inapplicable to a light), the particular target device may be excluded from eligibility for selection at block 530. If the absolute direction determined at block 520 does not correspond to a particular absolute direction region mapped with an eligible target control device, it may be determined which absolute direction region is closest. In such embodiments, the eligible target control device with the closest absolute direction region may be selected. In other embodiments, the command may be ignored if the absolute direction determined at block 525 does not correspond with a stored absolute direction region of an eligible target control device. It should be understood that block 530 may be performed directly by the remote control device or may be performed by a wireless communication controller, such as detailed in relation to FIG. 2.

At block 535, a command language mapped to the target control device selected at block 530 may be determined. The same command may take different forms depending on the target control device. For instance, a power command may be formatted differently for a television receiver than a smart light. A particular type of wireless transmitter to be used to transmit the command may also be determined at block 535 based on the target control device.

At block 540, a message indicative of the received user input (the command) may be transmitted to the target control device in the determined command language. This message may be transmitted directly from the remote control device to the target control device or may be transmitted to the target control device by the wireless communication controller.

Figure 6:
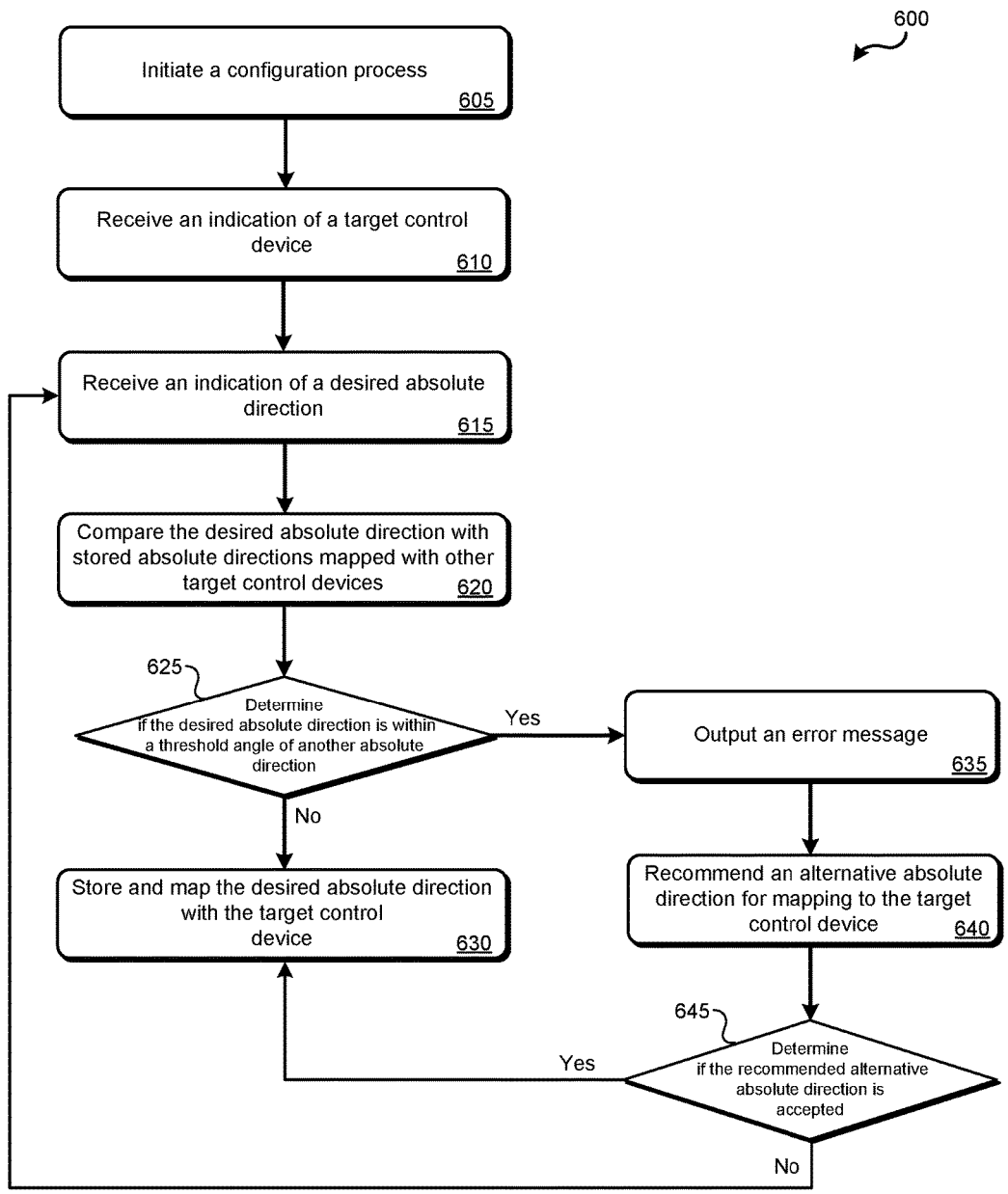
FIG. 6 illustrates an embodiment of a method for configuring a remote control device system.

FIG. 6 illustrates an embodiment of a method 600 for configuring a remote control device system. Steps of method 600 may be performed using remote control device 100 of FIG. 1, remote control system 200 of FIG. 2, or some other embodiment of a remote control device or system. Method 600 may be performed prior to method 500 in order to initially configure a remote control device or the remote control system to be able to control one or more target control devices based on the absolute direction of a remote control.

At block 605, the configuration process may be initiated. The configuration process may be initiated based on a user providing input indicating the desire to configure the absolute directions to the remote control device and/or the wireless communication controller. At block 610, the user may provide an indication of the target control device that is received by the remote control device and/or the wireless communication controller. For instance, the user may specify the make and model of the target control device and/or provide login information for the target control device. As part of the configuration process, the user may perform a session calibration as detailed in block 505 of method 500 such that a location of the user can be determined in relation to a predefined object or location.

At block 615, an indication of the desired absolute direction to be mapped to the target control device indicated at block 610 may be received. The indication of the desired absolute direction may be received in the form of the user pointing the remote control device in the desired absolute direction and providing user input to the remote control device (e.g., pushing a button). The desired absolute direction may be pointed at the target control device or in some other direction which the user desires to be mapped to the target control device.

At block 620, the desired absolute direction received at block 615 may be compared with other stored absolute directions maps with other target control devices. This comparison may be performed by either the remote control device itself or by a wireless communication controller in communication with the remote control device. This comparison may be performed to determine if the desired absolute direction is too similar to another absolute direction associated with another target control device. At block 625 it may be determined based on the comparison of block 620 if the desired absolute direction is within a threshold angle of another absolute direction. Said another way, it may be determined if an absolute direction region of the desired absolute direction overlaps an absolute direction region mapped to another target control device.

At block 625, if the determination is no, the desired absolute direction may be stored and mapped with the target control device at block 630. An indication of the desired absolute direction may be stored directly by the remote control device or may be stored and mapped at the wireless communication controller. In some embodiments, method 600 may be repeated from various locations within a room such that different absolute directions can be linked with the same target control device depending on where the user is located within the room as detailed in relation to FIG. 4.

At block 625, if the determination is yes, an error message may be output at block 635 saying that the desired absolute direction is not available. At block 640, an alternative absolute direction for mapping to the target control device may be recommended. This may involve altering a shape of an absolute direction region or altering one or more absolute direction regions to create a greater separation between the absolute directions, such as detailed in relation to FIGS. 3A and 3B, respectively.

At block 645, if the recommended alternative absolute direction is accepted, method 600 may proceed to block 630. If not, method 600 may proceed to block 615 in order to receive an indication of a different desired absolute direction to use instead. Again here, method 600 may be repeated multiple times in order to determine the absolute directions to be used from various user locations within a room and, possibly, to allow absolute directions to be calculated for other user locations within the room.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional blocks not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps or blocks may be undertaken before, during, or after the above elements are considered.

What is claimed is:

1. A remote control device, comprising:
   a user interface;
   an accelerometer;
   a magnetometer;
   a wireless communication interface; and
   a processing system that is in communication with the wireless communication interface, receives input from the user interface, and receives measurements from the accelerometer and the magnetometer, wherein the processing system is configured to:
   receive a first user input indicative of the remote control device being pointed at a predefined object within a room, wherein:
   the predefined object is to be used as a designated calibration point; and
   the first user input is indicative of a new control session;
   perform a calibration measurement based on the remote control device being pointed at the predefined object within the room;
   access a stored set of absolute directions from a plurality of stored sets of absolute directions based on the calibration measurement, wherein:

each set of absolute directions of the plurality of stored sets of absolute directions is associated with a sitting location within the room; and in response to a second user input received via the user interface:
determine an orientation of the remote control device with respect to gravity based on one or more measurements received from the accelerometer;
determine a compass heading direction in which the remote control device is pointed based on one or more measurements received from the magnetometer;
determine an absolute direction based on the determined orientation and the determined compass heading direction;
select a target control device from a plurality of target control devices based on the absolute direction of the remote control device and the accessed stored set of absolute directions, wherein each target control device of the plurality of target control devices is mapped to a range of absolute headings of the accessed stored set of absolute directions;
determine a command language mapped to the selected target control device of the plurality of target control devices; and
cause a message indicative of the second user input to be transmitted in the determined command language to the selected target control device by the wireless communication interface.

2. The remote control device of claim 1, wherein the processing system is further configured to:
initiate a configuration process in response to a third user input;
receive an indication of the target control device;
receive user input indicating that the remote control device is pointed in a first absolute direction that is to be mapped to the remote control device; and
link the absolute direction with the target control device indicated by the indication.

3. The remote control device of claim 1, wherein the processing system is further configured to:
initiate a configuration process in response to a third user input;
receive an indication of the target control device;
receive user input indicating that the remote control device is pointed in a first absolute direction that is desired to be mapped to the remote control device;
determine that the first absolute direction is within a threshold range of a second absolute direction linked with another target control device of the plurality of target control devices; and
output an indication that the first absolute direction is not available to be linked with the target control device.

4. The remote control device of claim 3, wherein the processing system is further configured to:
in response to determining that the first absolute direction is within the threshold range of the second absolute direction linked with another target control device, determine a recommended third absolute direction to link with the target control device; and
output an indication of the recommended third absolute direction as a suggested absolute direction for control of the target control device.

5. The remote control device of claim 1, further comprising a plurality of wireless communication interfaces that includes the wireless communication interface, wherein the processing system is further configured to:
select the wireless communication interface based on the selected target control device such that the message indicative of the second user input is transmitted via the selected wireless communication interface.

6. The remote control device of claim 1, wherein the plurality of target control devices comprises a television receiver and a television.

7. The remote control device of claim 1, wherein the processing system is further configured to:
select the target control device from the plurality of target control devices based on the second user input, wherein certain user input excludes one or more target control devices of the plurality of target control devices from eligibility for selection.

8. A method for controlling a device, the method comprising:
receiving, by a remote control device, a first user input;
in response to receiving the first user input:
determining, by the remote control device, an orientation of the remote control device with respect to gravity based on one or more measurements received from an accelerometer;
determining, by the remote control device, a compass heading direction in which the remote control device is pointed based on one or more measurements received from a magnetometer;
determining, by the remote control device, an absolute direction based on the determined orientation and the determined compass heading direction;
selecting, by the remote control device, a target control device from a plurality of target control devices based on the absolute direction of the remote control device, wherein each target control device of the plurality of target control devices is mapped to a range of absolute headings;
determining, by the remote control device, a command language mapped to the selected target control device of the plurality of target control devices;
transmitting, by the remote control device, a message indicative of the first user input in the determined command language to the selected target control device;
initiating a configuration process in response to a second user input;
receiving an indication of the target control device;
receiving user input indicating that the remote control device is pointed in a first absolute direction that is desired to be mapped to the remote control device;
determining that the first absolute direction is within a threshold range of a second absolute direction linked with another target control device of the plurality of target control devices; and
outputting an indication that the first absolute direction is not available to be linked with the target control device.

9. The method for controlling the device of claim 8, further comprising:
in response to determining that the first absolute direction is within the threshold range of the second absolute direction linked with another target control device, determining a recommended third absolute direction to link with the target control device; and
output an indication of the recommended third absolute direction as a suggested absolute direction for control of the target control device.

10. The method for controlling the device of claim 8, further comprising:
- determining a new control session is to begin;
- receiving user input indicative of the remote control device being pointed at a predefined calibration point; and
- determining a plurality of absolute headings for the plurality of target control devices based on the predefined calibration point, wherein the plurality of absolute headings comprises the absolute heading.

11. The method for controlling the device of claim 8, further comprising:
- selecting, by the remote control device, a wireless communication interface based on the selected target control device such that the message indicative of the user input is transmitted via the selected wireless communication interface.

12. The method for controlling the device of claim 8, wherein the plurality of target control devices comprises a television receiver and a television.

13. The method for controlling the device of claim 8, further comprising:
- selecting the target control device from the plurality of target control devices based on the user input, wherein certain user input excludes one or more target control devices of the plurality of target control devices from eligibility for selection.

14. A non-transitory processor-readable medium comprising processor-readable instructions configured to cause one or more processors of a remote control device to:
- receive a first user input indicative of the remote control device being pointed at a predefined object within a room, wherein:
  - the predefined object is to be used as a designated calibration point; and
  - the first user input is indicative of a new control session;
- perform a calibration measurement based on the remote control device being pointed at the predefined object within the room;
- access a stored set of absolute directions from a plurality of stored sets of absolute directions based on the calibration measurement; and
- receive a second user input;
- in response to the second user input:
  - determine an orientation of the remote control device with respect to gravity based on one or more measurements received from an accelerometer;
  - determine a compass heading direction in which the remote control device is pointed based on one or more measurements received from a magnetometer;
  - determine an absolute direction based on the determined orientation and the determined compass heading direction;
  - select a target control device from a plurality of target control devices based on the absolute direction of the remote control device and the accessed stored set of absolute directions, wherein each target control device of the plurality of target control devices is mapped to a range of absolute headings of the accessed stored set of absolute directions;
  - determine a command language mapped to the selected target control device of the plurality of target control devices; and
  - cause a message indicative of the second user input to be transmitted in the determined command language to the selected target control device.

15. The non-transitory processor-readable medium of claim 14, wherein the processor-readable instructions are further configured to cause the one or more processors to:
- initiate a configuration process in response to a third user input;
- receive an indication of the target control device;
- receive user input indicating that the remote control device is pointed in a first absolute direction that is to be mapped to the remote control device; and
- link the absolute direction with the target control device indicated by the indication.

16. The non-transitory processor-readable medium of claim 14, wherein the processor-readable instructions are further configured to cause the one or more processors to:
- initiate a configuration process in response to a third user input;
- receive an indication of the target control device;
- receive user input indicating that the remote control device is pointed in a first absolute direction that is desired to be mapped to the remote control device;
- determine that the first absolute direction is within a threshold range of a second absolute direction linked with another target control device of the plurality of target control devices; and
- output an indication that the first absolute direction is not available to be linked with the target control device.

17. The non-transitory processor-readable medium of claim 16, wherein the processor-readable instructions are further configured to cause the one or more processors to:
- in response to determining that the first absolute direction is within the threshold range of the second absolute direction linked with another target control device, determine a recommended third absolute direction to link with the target control device; and
- output an indication of the recommended third absolute direction as a suggested absolute direction for control of the target control device.

* * * * *